United States Patent
Nomura et al.

(10) Patent No.: US 8,617,684 B2
(45) Date of Patent: *Dec. 31, 2013

(54) VACUUM THERMAL INSULATING MATERIAL AND THERMAL INSULATING BOX INCLUDING THE SAME

(75) Inventors: Kyoko Nomura, Tokyo (JP); Syuichi Iwata, Tokyo (JP); Tsukasa Takagi, Tokyo (JP); Hideaki Nakano, Tokyo (JP); Yosuke Fujimori, Tokyo (JP); Masanori Tsujihara, Tokyo (JP); Nobuo Yamamoto, Tokyo (JP); Syohei Abiko, Tokyo (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 219 days.

This patent is subject to a terminal disclaimer.

(21) Appl. No.: 13/142,810

(22) PCT Filed: Apr. 28, 2009

(86) PCT No.: PCT/JP2009/058346
§ 371 (c)(1),
(2), (4) Date: Jun. 29, 2011

(87) PCT Pub. No.: WO2010/087039
PCT Pub. Date: Aug. 5, 2010

(65) Prior Publication Data
US 2011/0274868 A1     Nov. 10, 2011

(30) Foreign Application Priority Data
Jan. 29, 2009  (JP) .................................. 2009-018153

(51) Int. Cl.
*F16L 59/065* (2006.01)

(52) U.S. Cl.
USPC ............................................ 428/69; 62/440

(58) Field of Classification Search
USPC ................................................ 428/69; 62/440
See application file for complete search history.

(56) References Cited

U.S. PATENT DOCUMENTS

| 4,681,788 A * | 7/1987 | Barito et al. ................... 428/68 |
| 2008/0095970 A1 | 4/2008 | Takashima et al. |

FOREIGN PATENT DOCUMENTS

| CN | 101023291 A | 8/2007 |
| CN | 101363566 A | 2/2009 |
| GB | 2451614 A | 2/2009 |
| JP | 07-103955 B | 11/1995 |

(Continued)

OTHER PUBLICATIONS

Office Action from Japanese Patent Office dated Jan. 29, 2013, issued in corresponding Japanese Patent Appln. No. 2009-018153, with English translation thereof (4 pages).

(Continued)

*Primary Examiner* — Alexander Thomas
(74) *Attorney, Agent, or Firm* — Buchanan Ingersoll & Rooney PC

(57) ABSTRACT

There are provided a vacuum thermal insulating material that is excellent in terms of a handling property, a thermal insulating property, creep resistance, and productivity; and a thermal insulating box including the vacuum thermal insulating material. A core material was enclosed and sealed in a wrapping material with a gas barrier property. The core material of the vacuum thermal insulating material in which the interior of the wrapping material is in a decompression state, is constituted by one organic fibrous assembly having continuous organic fibers formed sheet-shaped or a stack of the organic fibrous assemblies.

4 Claims, 5 Drawing Sheets

(56) References Cited

FOREIGN PATENT DOCUMENTS

| | | |
|---|---|---|
| JP | 08-028776 A | 2/1996 |
| JP | 2002-058604 A | 2/2002 |
| JP | 2002-188791 A | 7/2002 |
| JP | 2002-333092 A | 11/2002 |
| JP | 2005-055086 A | 3/2005 |
| JP | 2005-344832 A | 12/2005 |
| JP | 2005-344870 A | 12/2005 |
| JP | 2006-017151 A | 1/2006 |
| JP | 2006-029505 A | 2/2006 |
| JP | 2006-153199 A | 6/2006 |
| JP | 2006-283817 A | 10/2006 |
| JP | 2006-307921 A | 11/2006 |
| WO | 2006009146 A1 | 1/2006 |

OTHER PUBLICATIONS

Office Action (Notice of Reasons for Rejection) dated Oct. 25, 2012, issued in corresponding Chinese Patent Application No. 200980155647.9, and an English Translation thereof. (9 pages).

International Search Report (PCT/ISA/210) issued on Jul. 14, 2009, by Japanese Patent Office as the International Searching Authority for International Application No. PCT/JP2009/058346 and the English Language Translation thereof.

Notification of the Second Office Action dated May 21, 2013 issued in corresponding Chinese Patent Application No. 200980155647.9, with an English translation of the text portion thereof.

* cited by examiner

US 8,617,684 B2

VACUUM THERMAL INSULATING MATERIAL AND THERMAL INSULATING BOX INCLUDING THE SAME

TECHNICAL FIELD

The present invention relates to a vacuum thermal insulating material and a thermal insulating box including the same, in particular, to a vacuum thermal insulating material suitably applicable to cold equipment and a thermal insulating box including the same.

BACKGROUND ART

In general, thermal insulating materials have been conventionally composed of urethane. However, vacuum thermal insulating materials having a better thermal insulating property than urethane have been recently used with the urethane. Such vacuum thermal insulating materials are used for refrigerators and cold equipments such as heat insulating storage tanks, air conditioners for vehicles, and water heaters.

A vacuum thermal insulating material has a powder, a foam, fibers, or the like serving as a core material contained in a wrapping material composed of aluminum foil and having a gas barrier property (equal to an air shutoff property), whose interior is maintained at a degree of vacuum of several Pa.

Possible causes of degradation of the thermal insulating property of such a vacuum thermal insulating material are air and water entering the vacuum thermal insulating material from outside, gas emitted from the core material, and moisture originally contained in the core material. To absorb these substances, an absorbent is inserted into the wrapping material.

Although as a core material of the vacuum thermal insulating material, powder such as silica, foam such as urethane, and fiber body such as glasses are available, the fiber body having the most superior thermal insulating performance becomes a mainstream nowadays.

Fibers are broadly divided into two types: inorganic fibers and organic fibers. Examples of inorganic fibers include glass fibers and carbon fibers (for example, see Patent Documents 1 and 8). Examples of organic fibers include polystyrene fibers, polypropylene fibers, polylactide fibers, aramid fibers, LCP (liquid crystal polymer) fibers, polyethylene terephthalate fibers, polyester fibers, polyethylene fibers, and cellulose fibers (for example, see Patent Documents 2, 7, and 9).

Such fibers are arranged in a shape (form) of, for example, a flocculent form, a stack of sheets (for example, see Patent Documents 3 and 4), or a stack of sheets in which the sheets are stacked such that the fibers are alternately oriented in different directions (for example, see Patent Documents 5 and 6).

PRIOR-ART REFERENCES

Patent Documents

Patent Document 1: Japanese Unexamined Patent Application Publication No, 08-028776 (pages 2-3)
Patent Document 2: Japanese Unexamined Patent Application Publication No, 2002-188791 (pages 4-6, FIG. 1)
Patent Document 3: Japanese Unexamined Patent Application Publication No. 2005-344832 (pages 3-4, FIG. 1)
Patent Document 4: Japanese Unexamined Patent Application Publication No. 2006-307921 (pages 5-6, FIG. 2)
Patent Document 5: Japanese Unexamined Patent Application Publication No. 2006-017151 (page 3, FIG. 1)
Patent Document 6: Japanese Examined Patent Application Publication No. 07-103955 (page 2, FIG. 2)
Patent Document 7: Japanese Unexamined Patent Application Publication No. 2006-283817 (pages 7-8)
Patent Document 8: Japanese Unexamined Patent Application Publication No. 2005-344870 (page 7, FIG. 2)
Patent Document 9: Japanese Unexamined Patent Application Publication No. 2006-153199 (pages 3-4)

SUMMARY OF THE INVENTION

Problems to be Solved by the Invention

Conventional vacuum thermal insulating materials generally contain glass fibers and polyester fibers serving as core materials. However, glass fibers are hard and brittle and hence dusts of glass fibers generated when manufacturing of vacuum thermal insulating materials may scatter and adhere to skin, mucous membranes, and the like of workers and can cause stimulation. For this reason, handling property and workability of glass fibers are seen as problematic. In addition, in case of recycling, refrigerators are shredded one by one in a recycling plant and glass fibers as well as waste urethane and the like are together subjected to thermal recycling, for example. But combustion efficiency is decreased and the glass fibers remain as a residue. Thus, vacuum thermal insulating materials containing glass fibers have a problem of poor recyclability.

In contrast, organic fibers such as polyester fibers are excellent in terms of a handling property and recyclability. However, organic fibers have a thermal conductivity, which is an indicator of a thermal insulating property, of 0.0030 W/mK (see Patent Document 7) whereas glass fibers have a thermal conductivity of 0.0013 W/mK (see Patent Document 8). Thus, organic fibers have a problem of a poor thermal insulating property. In this case, the thermal insulating property can be enhanced by stacking thin layers of organic fibers in such a manner that the fibers are oriented perpendicular to the thermal conduction direction. However, at least several hundred layers are stacked and hence productivity is degraded.

Vacuum thermal insulating materials having organic fibers such as polyester fibers serving as core materials tend to creep over time due to atmospheric pressure. Supposing to be used in refrigerators and the like, the occurrence of creep is not preferable because of problems such as generation of irregularities in aesthetic surfaces and falling of shelf boards in storage tanks.

The present invention has been achieved to overcome the above-described problems. An object of the present invention is to provide a vacuum thermal insulating material that is excellent in terms of a handling property, a thermal insulating property, creep resistance, and productivity; and a thermal insulating box including the vacuum thermal insulating material.

Means for Solving the Problems

The present invention provides a vacuum thermal insulating material that has a core material enclosed and sealed in a wrapping material having a gas barrier property, whose interior is made to be a decompression state, wherein the core material is constituted by one sheet of organic fibrous assembly having continuous organic fibers formed sheet shape or a stack of the organic fibrous assemblies.

A thermal insulating box according to the present invention includes an outer box, an inner box disposed in the outer box, and the above-described vacuum thermal insulating material in a gap formed between the outer box and the inner box.

Advantages

According to the present invention, since a core material is constituted by one fibrous assembly having continuous organic fibers formed sheet shape or a stack of the fibrous assemblies, the vacuum thermal insulating material can be provided that is excellent in terms of a thermal insulating property, creep resistance, and productivity.

A thermal insulating box including the above-described vacuum thermal insulating material, as a result, excellent in terms of recyclability can also be obtained.

MODES FOR CARRYING OUT THE INVENTION

Embodiment 1

Figure 1:
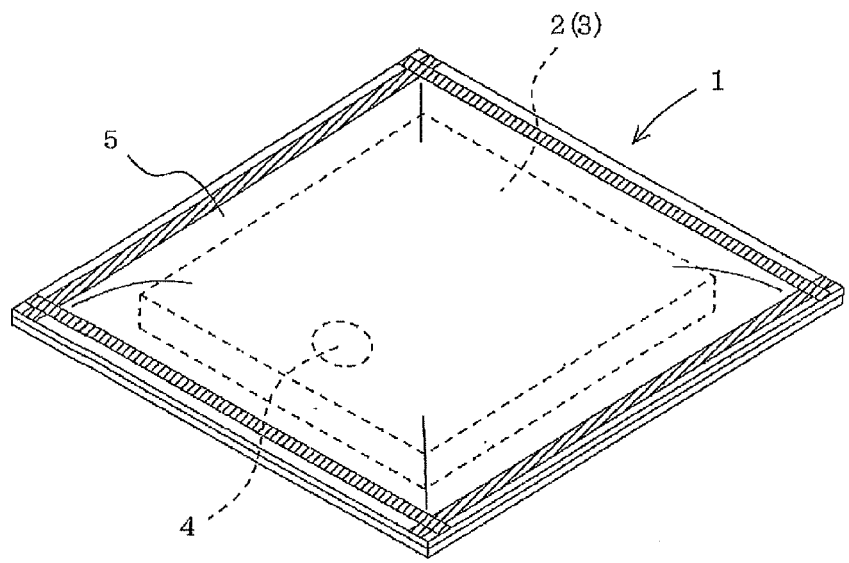
FIG. 1 is a perspective view of a vacuum thermal insulating material according to Embodiment 1 of the present invention.
Figure 2:
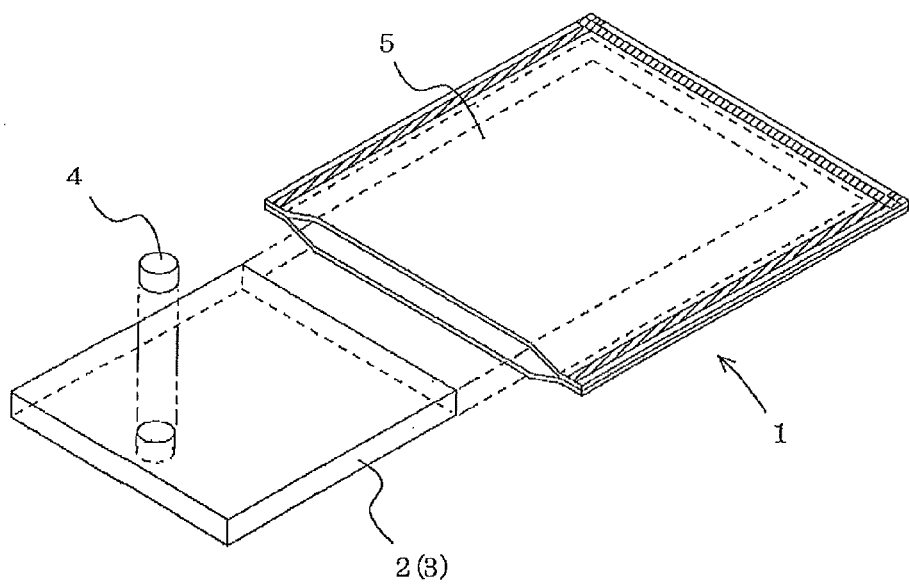
FIG. 2 is an exploded perspective view of FIG. 1.
Figure 3:
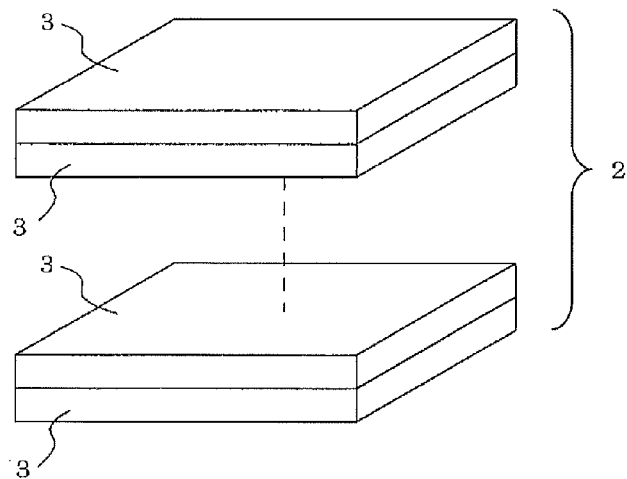
FIG. 3 is an explanatory view showing a stacked state in the core material in FIG. 2.

Referring to FIG. 1 showing a vacuum thermal insulating material according to Embodiment 1 of the present invention and FIG. 2 showing an exploded view of this vacuum thermal insulating material, a vacuum thermal insulating material 1 encloses and sealed a core material 2 composed of an assembly 3 (hereinafter, referred to as a fibrous assembly) forming a sheet-shaped continuous organic fibers (long fibers) made of polyester, in a gas barrier container 5 (hereinafter, referred to as a wrapping material) having an air shutoff property, interior of which is reduced to a certain degree of vacuum. The core material 2 may be constituted by one sheet-shaped fibrous assembly 3. Alternatively, referring to FIG. 3, the core material 2 may be constituted by a stack of a plurality of sheet-shaped fibrous assemblies 3. Reference numeral 4 denotes a gas absorbent that is provided or embedded in the core material 2 and absorbs gas and moisture.

The fibrous assembly 3 of long fibers constituting the core material 2 is produced by discharging and dropping a polyester resin molten by heating onto a conveyor from nozzles aligned in accordance with the width to be produced and rolling up the resin while the conveyor is moved at a certain speed. In this case, by adjusting bulk density of the fibrous assembly 3 with the discharge amount of the molten resin and the speed of the conveyor, sheet-shaped fibrous assembly 3 with a different thickness can be obtained.

The thus-obtained fibrous assembly 3 is cut into, for example, A4 size and the core material 2 is prepared. In this case, whether the core material 2 is constituted by one sheet-shaped fibrous assembly 3 or a stack of a plurality of the sheet-shaped fibrous assemblies 3 should be determined on a case-by-case basis in consideration of the thickness of the fibrous assembly 3 obtained and the thickness of the vacuum thermal insulating material 1 to be produced.

In the above description, polyester is used as a material for the fibrous assembly 3 constituting the core material 2. However, the material is not restricted to polyester, and polystyrene, polypropylene, polylactide, aramid, LCP (liquid crystal polymer), or the like may also be used.

Polystyrene has a high stiffness and hence polystyrene vacuum-packed in the wrapping material 5 and subjected to atmospheric pressure maintains its shape to a high degree and the porosity of polystyrene can be increased. Additionally, polystyrene has a low solid thermal conductivity and hence the thermal insulating property of a vacuum thermal insulating material can be enhanced.

Polypropylene has a low hygroscopicity and hence drying time and evacuating time can be reduced, thereby increasing productivity. Additionally, polypropylene has a low solid thermal conductivity and hence enhancement of the thermal insulating property of a vacuum thermal insulating material can be expected.

Polylactide is biodegradable and hence, after use of a product, the core material 2 separated from the disassembled product can be disposed of in landfills.

Aramid and LCP have a high stiffness and hence aramid and LCP vacuum-packed and subjected to atmospheric pressure maintain their shapes to a high degree and the porosity of aramid and LCP can be increased. Thus, the thermal insulating property can be enhanced.

The wrapping material 5 of the vacuum thermal insulating material 1 was used of plastic laminate films that have a gas barrier property and are constituted by nylon (15 μm), aluminum-deposited PET (12 μm), aluminum foil (6 μm), and high density polyethylene (50 μm). Alternatively, when laminate films are used that contain no aluminum foil and are constituted by, for example, polypropylene, polyvinyl alcohol, and polypropylene, deterioration in the thermal insulating property caused by a heat bridge can be suppressed. Note that three sides out of the four sides of two stacked plastic laminate films are heat-sealed in advance with a seal packaging machine such that the laminate films form a bag.

The core material 2 was inserted from the opening of the bag-shaped wrapping material 5 and the resultant structure was dried for half a day (about 12 hours) with a thermostatic oven at a temperature of 100° C. while the rest of opening side was fixed so as to remain open. After that, the gas absorbent 4 for absorbing remained gas, outgassing from the core material 2 over time, and gas permeating through the sealed layers of the wrapping material 5 was inserted into the wrapping material 5. The wrapping material 5 was evacuated with a Kashiwagi-style vacuum packaging machine (KT-650 manufactured by NPC Incorporated).

This evacuation was conducted until the degree of vacuum in the chamber reached about 1 to 10 Pa and, in this state, the opening of the wrapping material 5 was heat-sealed in the chamber. Thus, the vacuum thermal insulating material 1 having the shape of a plate was obtained.

The specifications of the vacuum thermal insulating materials 1 whose core material 2 is the sheet-shaped fibrous assembly 3 according to the present Embodiment, are shown in Table 1. In Examples 1 and 2 and Comparative examples 1 to 3 in Table 1, each vacuum thermal insulating material 1 is constituted by accommodating one sheet of the fibrous assembly 3 composed of long fibers whose material is polyester having a mean fiber diameter of 13 μm and different thicknesses, respectively.

The mean fiber diameter was calculated as the mean value of the diameters of long fibers measured at 10 points with a microscope. The areal weight was calculated as the weight per unit area of each vacuum thermal insulating material 1 constituted by one sheet-shaped fibrous assembly 3 and the wrapping material 5 containing the fibrous assembly 3. Although fibers having a mean fiber diameter of 13 μm were used in Examples and Comparative examples, fibers having a smaller mean fiber diameter exhibit a better thermal insulating property. In theory, the mean fiber diameter is desirably 10 μm or less.

TABLE 1

| | Areal weight g/m² | Mean fiber diameter μm |
|---|---|---|
| Example 1 | 199 | 13 |
| Example 2 | 98 | |
| Comparative example 1 | 51 | |
| Comparative example 2 | 26 | |
| Comparative example 3 | 18 | |

<Thermal Insulating Property>

Next, the thermal insulating property of the vacuum thermal insulating material 1 according to the present Embodiment will be investigated.

The thermal conductivity of each vacuum thermal insulating material 1 shown in Table 1 was measured at a temperature difference between an upper temperature of 37.7 degree C. and a lower temperature of 10.0 degree C. using a thermal conductivity tester "AUTO ^HC-073 manufactured by EKO Instruments Co., Ltd." This measurement was conducted after a lapse of one day from the evacuation step.

Figure 4:
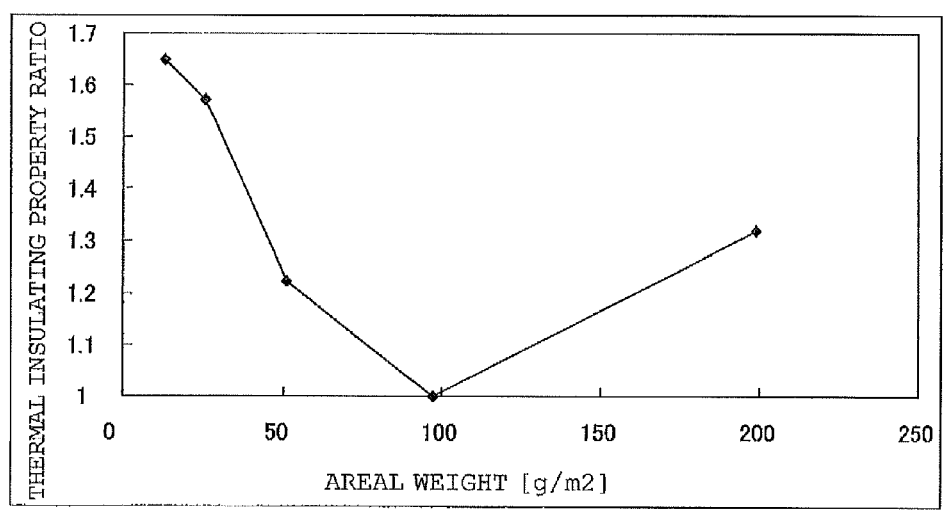
FIG. 4 is a graph showing the relationship between the areal weight and the thermal insulating property of vacuum thermal insulating materials.

FIG. 4 is a graph showing the relationship between the areal weight and the thermal insulating property of the vacuum thermal insulating materials 1 in Table 1.

The ordinate axis in FIG. 4 indicates thermal insulating property ratios that are values respectively obtained by respectively dividing the thermal conductivity of the vacuum thermal insulating material 1 according to Example 2 in Table 1 by the thermal conductivities of the vacuum thermal insulating materials 1 according to Examples 1 and 2 and Comparative examples 1 to 3, the values being equal to the reciprocal of values obtained by dividing the thermal conductivities of the vacuum thermal insulating materials 1 according to Examples 1 and 2 and Comparative examples 1 to 3 by the thermal conductivity of the vacuum thermal insulating material 1 according to Example 2.

As is obvious from the figure, the thermal insulating property of the vacuum thermal insulating materials 1 according to Examples 1 and 2 and Comparative examples 1 to 3 is the division point when the areal weight is 98 g/m² and increases as the areal weight increases from 98 g/m² or decreases from 98 g/m².

In the vacuum thermal insulating materials 1 according to the present Embodiment, thickness of the core material 2 increases as the areal weight increases. The thermal insulating property increases as the areal weight increases from 98 g/m² presumably because the sheet-shaped core material 2 becomes less prone to bend and fibers tend to be oriented in a direction perpendicular to the thermal conduction direction. The fibers tend to be oriented in this way presumably because the fibers used were continuous long fibers.

The thermal insulating property increases as the areal weight decreases from 98 g/m² presumably because, rather than the influences described above, the thickness of the sheet-shaped fibrous assembly 3 is small and fibers are oriented in a direction perpendicular to the thermal conduction direction, thereby enhancing the thermal insulating property.

<Comparison Between Long Fiber Core Material and Short Fiber Core Material>

To demonstrate that the thermal insulating property of the vacuum thermal insulating material 1 including the fibrous assembly 3 of long fibers serving as the core material 2 is high when the areal weight is 98 g/m² or more as described above, comparison was conducted between the vacuum thermal insulating materials 1 including the core materials 2 composed of long fibers shown in Table 1 and vacuum thermal insulating materials of Comparative examples 4 and 5 produced so as to have specifications shown in Table 2 and include core materials composed of short fibers obtained by cutting polypropylene long fibers having a mean fiber diameter of 13 μm into fibers having a length of, for example, about 5 to 10 mm.

TABLE 2

| | Areal weight g/m² | Fiber diameter μm |
|---|---|---|
| Comparative example 4 | 171 | 13 |
| Comparative example 5 | 208 | 13 |

Figure 5:
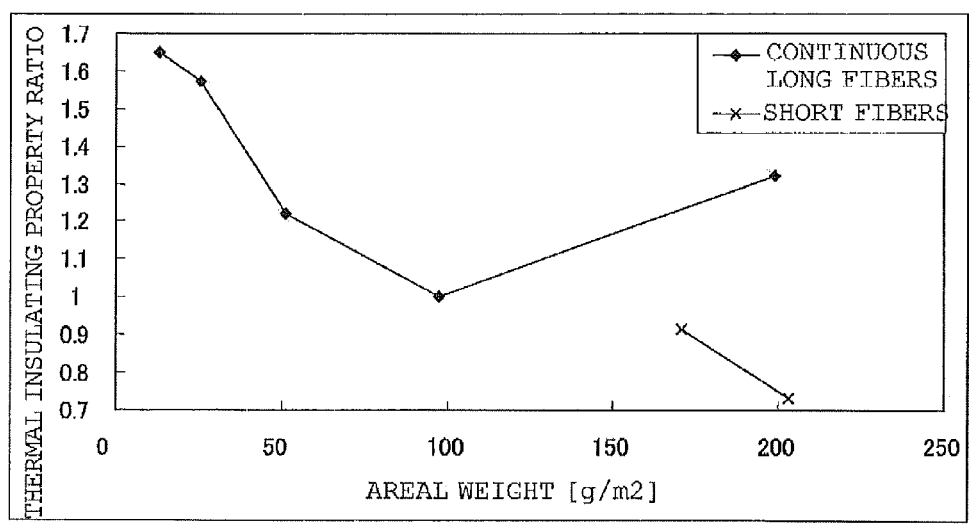
FIG. 5 is a graph showing the relationship between the areal weight and the thermal insulating property of vacuum thermal insulating materials including core materials of long fibers and core materials of short fibers.

FIG. 5 is a graph showing the relationship between the areal weight and the thermal insulating property of the vacuum thermal insulating materials including the core material of the long fibers and the core material of the short fibers.

The thermal insulating property ratios in the ordinate axis in FIG. 5 includes, in addition to those in the ordinate axis of the graph in FIG. 4, values respectively obtained by dividing the thermal conductivity of the vacuum thermal insulating material 1 according to Example 2 in Table 1 by the thermal conductivities of the vacuum thermal insulating materials according to Comparative examples 4 and 5 in Table 2, the values being equal to the reciprocal of values respectively obtained by dividing the thermal conductivities of the vacuum thermal insulating materials according to Comparative examples 4 and 5 by the thermal conductivity of the vacuum thermal insulating material 1 according to Example 2.

As is obvious from FIG. 5, the vacuum thermal insulating materials 1 including the fibrous assembly 3 of long fibers serving as the core material 2 have a better thermal insulating property than the vacuum thermal insulating materials including short fibers serving as the core material.

This is because, in a vacuum thermal insulating material including short fibers serving as the core material, the length of the fibers is short and the fibers tend to incline and hence the fibers tend to be oriented in the thermal conduction direction and the thermal insulating property is degraded as the areal weight increases.

In contrast, in the vacuum thermal insulating material 1 including the fibrous assembly 3 of long fibers serving as the core material 2, the fibers tend to be oriented in a plane direction perpendicular to the thermal conduction direction. As a result, the path of fixed thermal conduction in the vacuum thermal insulating material 1 in the thermal insulating direction is increased and hence the thermal insulating property is enhanced. Additionally, the areal weight is high and hence the vacuum thermal insulating material 1 becomes less prone to bend and the fibers tend to be oriented in a direction perpendicular to the thermal conduction direction, which presumably enhance the thermal insulating property.

<Comparison of Compressive Strain>

Hereinafter, the compressive strain of the vacuum thermal insulating material 1 according to the present invention is discussed.

The vacuum thermal insulating materials 1 in Table 1 were produced in the manner described above and the thicknesses of these vacuum thermal insulating materials 1 were determined. These vacuum thermal insulating materials 1 were heated in a thermostatic oven at 60° C. for 11 hours and then the thicknesses of these vacuum thermal insulating materials 1 were again determined.

Figure 6:
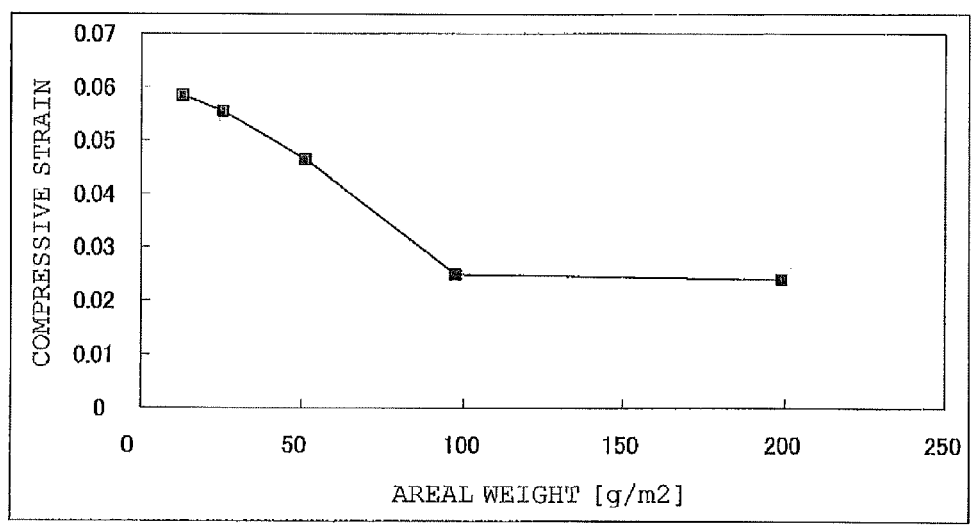
FIG. 6 is a graph showing the relationship between the areal weight and the compressive strain of vacuum thermal insulating materials.

FIG. 6 is a graph showing the relationship between areal weight and compressive strain.

Compressive strain: $(t_B-t_A)/t_A$ $t_A$: thickness of the vacuum thermal insulating material 1 before being heated $t_B$: thickness of the vacuum thermal insulating material 1 after being heated at 60° C. for 11 hours FIG. 6 shows that the compressive strain more steeply decreases as the areal weight increases to 98 g/m² and does not substantially change when the areal weight exceeds 98 g/m² (a lower compressive strain is better).

This is presumably because a low areal weight results in the fibrous assembly 3 having a small thickness and hence sufficiently high stiffness is not provided; in contrast, when the areal weight exceeds 98 g/m², the fibrous assembly 3 has a large thickness and has a sufficiently high stiffness.

Figure 7:
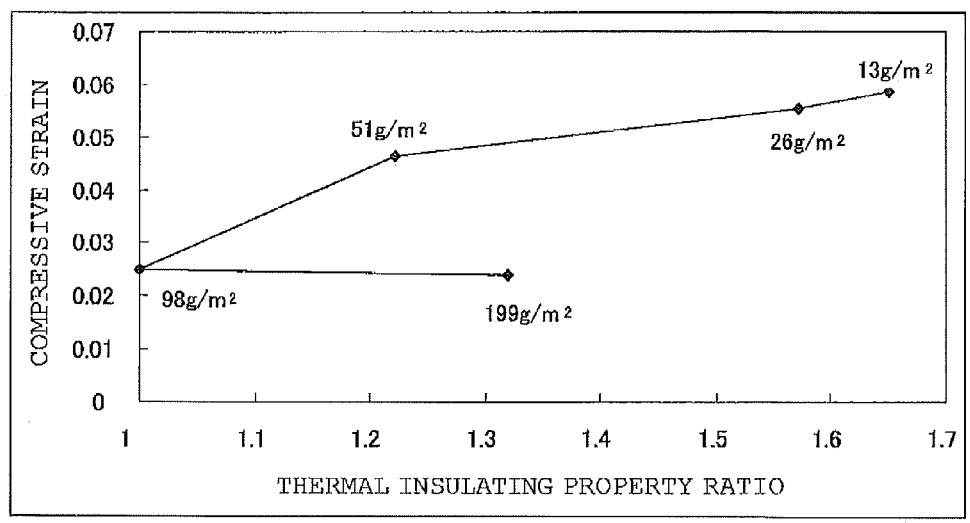
FIG. 7 is a graph showing the relationship between the thermal insulating property and the compressive strain of vacuum thermal insulating materials.

FIG. 7 is a graph showing the relationship between a thermal insulating property and compressive strain based on the data of the vacuum thermal insulating materials 1 of Examples 1 and 2 and Comparative examples 1 to 3 in Table 1. The values in the graph denote areal weights.

As is obvious from the figure, when comparison is performed at the same compression property, the vacuum thermal insulating materials 1 of Examples 1 and 2 having an areal weight of 98 g/m² or more have a compressive strain lower than that of the vacuum thermal insulating materials 1 of Comparative examples 1 to 3 having an areal weight of less than 98 g/m².

<Areal Weight and Number of Fibrous Assemblies Stacked>

Figure 8:
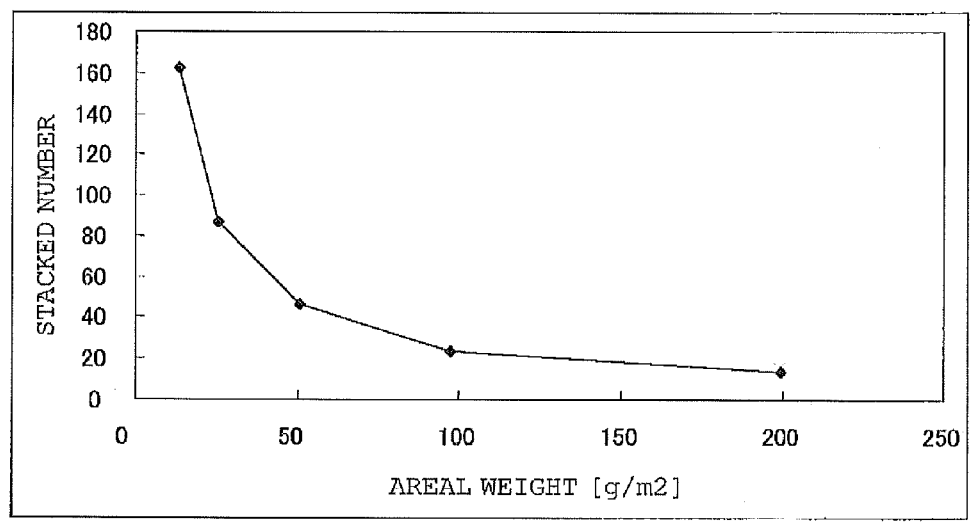
FIG. 8 is a graph showing the relationship between the areal weight and the number of fibrous assemblies stacked of vacuum thermal insulating materials.

FIG. 8 is a graph showing the relationship between the areal weight and the number of the fibrous assemblies 3 stacked in the vacuum thermal insulating material 1 of Example 1 in Table 1 when the vacuum thermal insulating material 1 has a thickness of 10 mm.

As is obvious from the figure, the number of the fibrous assemblies 3 stacked decreases as the areal weight increases. Thus, since a higher areal weight results in a smaller number of the fibrous assemblies 3 stacked and the vacuum thermal insulating material 1 can be obtained with higher productivity, the fibrous assembly 3 is preferably thick and has a small inclination of fibers and an areal weight of 98 g/m² or more. The upper limit of the number of the fibrous assemblies 3 stacked is not particularly described. The vacuum thermal insulating material 1 having an areal weight that can be achieved with one fibrous assembly 3 is preferred (because a stacking process can be eliminated in the production).

In summary, the vacuum thermal insulating material 1 according to the present invention desirably includes, as the core material 2, the fibrous assembly 3 having an areal weight of 98 g/m² or more in view of a thermal insulating property, creep resistance (low strain), and productivity.

Therefore, according to the present invention, the vacuum thermal insulating material 1 excellent in terms of a thermal insulating property, creep resistance, and productivity can be obtained.

Embodiment 2

Figure 9:
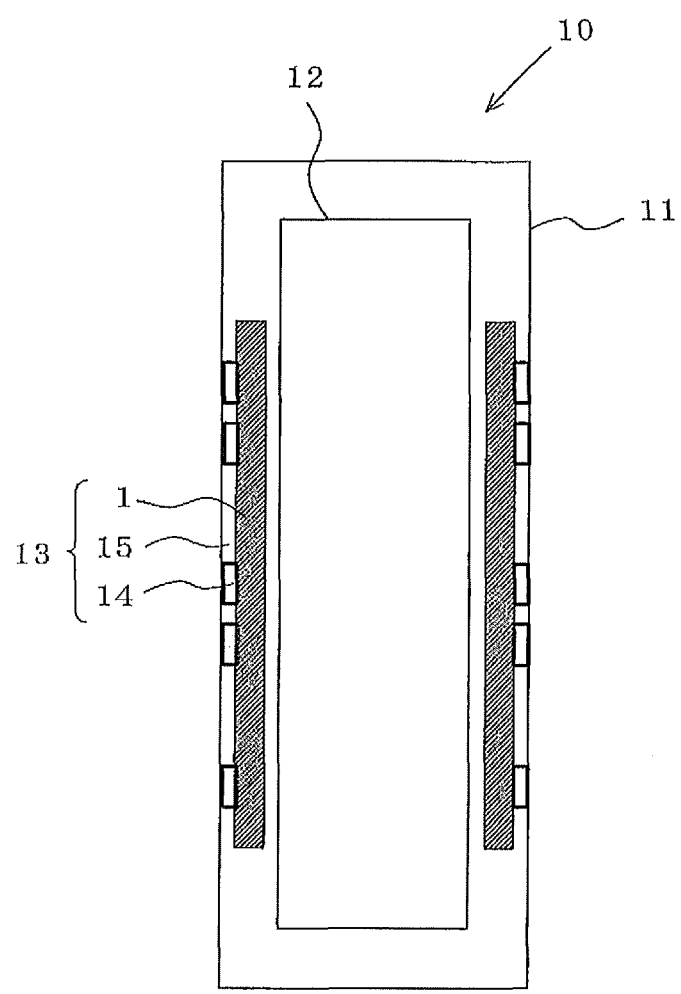
FIG. 9 is a schematic explanatory view of a thermal insulating box according to Embodiment 2 of the present invention.

FIG. 9 is an explanatory view of a thermal insulating box according to Embodiment 2 of the present invention and schematically shows a refrigerator.

A refrigerator 10 includes an outer box 11 constituted by coated steel plates, an inner box 12 that is disposed in the outer box 11 so as to be spaced apart from the outer box 11 with a gap therebetween and constituted by a resin molded article, and a thermal insulating wall 13 that is described below and provided in the gap formed between the outer box 11 and the inner box 12. The inner box 12 includes a refrigeration unit (not shown) for feeding cold air. The outer box 11 and the inner box 12 respectively have openings in the same plane and an openable door is provided for the openings (both the openings and the openable door are not shown).

The vacuum thermal insulating material 1 (exaggerated for purposes of illustration) according to the Embodiment 1 is placed in the gap between the outer box 11 and the inner box 12 of the refrigerator 10 and the gap is filled with polyurethane foam 15. Thus, the thermal insulating wall 13 is formed. However, the wrapping material 5 of the vacuum thermal insulating material 1 includes an aluminum foil and hence a heat bridge might be generated in which heat reaches the outer box 11 through the aluminum foil.

To prevent such generation of the heat bridge, the vacuum thermal insulating material 1 is provided so as to be spaced away from the outer box 11 with spacers 14 that are non-electrically conductive resin molded articles. The spacers 14 have holes to the extent appropriate for not hindering an injection so that voids are not left in the polyurethane foam 15 that is injected into the gap between the outer box 11 and the inner box 12 in a later step.

As described above, the refrigerator 10 according to the Embodiment 2 includes, in the gap between the outer box 11 and the inner box 12, the thermal insulating wall 13 constituted by the vacuum thermal insulating material 1 according to Embodiment 1, the spacers 14, and the polyurethane foam 15. The region where the thermal insulating wall 13 is provided is not restricted and the region may be the entirety or a part of the gap formed between the outer box 11 and the inner box 12. The thermal insulating wall 13 may be further provided in one or both of the gap between the outer box 11 and the vacuum thermal insulating material 1 and the gap between the inner box 12 and the vacuum thermal insulating material 1. The thermal insulating wall 13 may be provided in the openable door at the openings.

Refrigerators no longer being used are disassembled in local recycling centers and recycled in accordance with the home appliance recycling law. In this case, since the refrigerator 10 according to the present invention includes the vacuum thermal insulating material 1 containing the fibrous assembly 3 serving as the core material 2, the refrigerator 10 can be shredded without removing the vacuum thermal insulating material 1. The vacuum thermal insulating material 1 does not reduce combustion efficiency or remain as a residue in thermal cycling. Therefore, the refrigerator 10 has good recyclability.

In contrast, when a refrigerator includes a thermal insulating wall in which a vacuum thermal insulating material is provided and the core material of the member is composed of inorganic powder as described above, the refrigerator as a case body cannot be shredded in recycling because the inorganic powder is scattered. Thus, the vacuum thermal insulating material needs to be removed from the refrigerator at much expense in effort.

When a refrigerator includes a vacuum thermal insulating material containing glass fibers serving as a core material, the refrigerator as a case body can be shredded. However, the glass fibers after the shredding enter polyurethane foam and hence the glass fibers and the polyurethane foam are together subjected to thermal cycling. Thus, the glass fibers reduce combustion efficiency or remain as a residue after combustion. Thus, such a refrigerator has a problem in recyclability.

In the above description, the vacuum thermal insulating material 1 according to the present invention is applied to a refrigerator serving as an example of a thermal insulating box. However, application of the vacuum thermal insulating material 1 is not restricted thereto. The vacuum thermal insulating material 1 according to the present invention is also applicable to cold equipment and high temperature apparatuses such as heat insulating storage tanks, air conditioners for vehicles, and water heaters; and, instead of case bodies having predetermined shapes, thermal insulating bags (thermal insulating containers) including deformable external bags and internal bags.

Reference Numerals
   1 vacuum thermal insulating material
   2 core material
   3 fibrous assembly
   5 wrapping material
   10 refrigerator (thermal insulating box)
   11 outer box
   12 inner box
   13 thermal insulating wall
   14 spacer
   15 polyurethane foam

The invention claimed is:

1. A vacuum thermal insulating material that has a core material enclosed and sealed in a wrapping material having a gas barrier property, whose interior is made to be a decompression state, wherein
   the core material is constituted by one sheet of organic fibrous assembly having organic fibers formed sheet-shaped or a stack of the organic fibrous assemblies and oriented in a direction perpendicular to a thermal conduction direction
   wherein the core material containing the organic fibrous assembly has an areal weight between 98 $g/m^2$ and 199 $g/m^2$.

2. A thermal insulating box comprising an outer box and an inner box disposed in the outer box, wherein the vacuum thermal insulating material according to claim 1 is disposed in a gap formed between the outer box and the inner box.

3. The thermal insulating box according to claim 2, wherein a non-electrically conductive spacer is installed between the outer box and the vacuum thermal insulating material.

4. The thermal insulating box according to claim 2, wherein a thermal insulating material fills one or both of a gap between the outer box and the vacuum thermal insulating material and a gap between the vacuum thermal insulating material and the inner box.

* * * * *